Patented Mar. 11, 1930

1,749,819

UNITED STATES PATENT OFFICE

WILLIAM SCOTT HUTCHINSON, OF SCARSDALE, NEW YORK, ASSIGNOR, BY DIRECT AND MESNE ASSIGNMENTS, TO THE SILICA GEL CORPORATION, OF BALTIMORE, MARYLAND, A CORPORATION OF MARYLAND

DRY-CHARGED BATTERY PLATE

No Drawing.   Application filed July 13, 1925. Serial No. 43,405.

This invention relates to dry storage battery plates of the Fauré or pasted type in a charged condition.

Ordinarily storage batteries when charged are shipped with plates immersed in the electrolyte and the life of the battery begins from the time of immersion of the plates in the electrolyte.

When the negative plates have just been formed or developed the so-called active material or paste of the plate consists largely of pure sponge lead with a little lead sulphate. On being taken out of the forming bath and exposing to the air they oxidize rapidly and the acid adhering to the plate forms lead sulphate so that a skin is formed across the surface of the plate. When such negative plates are subsequently assembled with the positive plates and the electrolyte added the charge is not available and for all useful purposes they are not in a state of charge but require a considerable current or may be said to be charged in any useful sense.

The demand for a dry charged battery plate, especially a negative, has brought about a number of endeavors to produce such a plate which would be available practically at once upon the assembly of the plates and addition of the electrolyte. Among these may be mentioned the use of formaldehyde or other neutral gases in which the plates are dried so as to avoid oxidation as above referred to.

So far as I am aware all of these efforts have been in connection with negative plates which I believe is caused by the fact that when the positive plate is charged lead peroxide is formed, which does not oxidize, so that it has been considered sufficient to simply wash the acid off the plate.

According to the present invention it is proposed to stabilize the charged plate by treating it with an absorptive material which absorbs liquid from the plate and also acts to exclude the air sufficiently so that no intolerable amount of oxidation of the plate may take place. As an example of carrying out the invention negative plates formed and charged in the usual way are taken from the electrolyte and washed with water to remove all acid etc. These plates are then placed in a container either singly or in groups and covered with granulated silica gel which substantially removes the moisture by absorbing it. The absorption of the water by the gel causes considerable evolution of heat which assists the expulsion of the water from the plate and its absorption by the gel. (The action is even improved by heating the gel.)

While the negative plate has been more particularly referred to it has been found that the same method of treatment as referred to gives a very much improved plate when applied to positive plates. The positive plates thus treated have been very much better than those which are dried in the air or treated in other known ways. The positive plates thus treated give very much better results when assembled with the charged negatives and electrolyte than do the positives not so treated.

Another material which I may use in place of silica gel in the process above referred to, as an absorptive material is dry wood sawdust. Also good results may be obtained by using as a porous absorptive material calcium sulphate or gypsum ground to the desired degree of fineness. Also lime, dry slacked lime or hydrous aluminum oxide, dehydrated bauxite, dried cereals and other materials might be used. It is thus apparent that adsorbents and absorbents may be used in practicing my invention. I prefer to use adsorbents, and specifically silica gel. The word "sorbent" as used herein is intended to include both absorbents and adsorbents.

It is to be understood that within the meaning of this specification materials are absorptive which have the ability to take up liquid from the treated plates. Many substances not naturally porous may be made absorptive by powdering or granulating whereby the interstices between the particles act as absorptive pores. The material to take up the liquid or absorptive material should be ground or otherwise reduced to a condition of small particles. This is of benefit because, within limits, the smaller interstices produce more efficient absorption and the absorptive mass is more compact so that the air is more completely excluded from the plate. Care should be taken, however, that the material is not too fine a powder as it may then stick to the plates. This is avoided by the use of coarser particles which may be referred to as granulated. While it is believed that this condition produces the most efficient results, the invention may be availed of to a great extent under other conditions. The term "gel" as used in the specification and claims refers to a hard porous material. One method of preparing it is described in Patent No. 1,297,724.

While the invention has been set forth in what is considered its best illustrations the details of the process may be varied without departing from the spirit of the invention, it is not, therefore, limited to the precise details of method as recited.

What I claim is:

1. The method of preparing for storage and shipment a formed storage battery plate which comprises contacting the active material of the plate with a solid adsorbent material capable of adsorbing the liquid, the said material being of such character as not to stick to the plate.

2. The method of preparing for storage and shipment a formed storage battery plate which comprises contacting the active material of the plate with an adsorptive gel capable of adsorbing the liquid.

3. The method according to claim 2 wherein the material is a silica gel.

4. The method according to claim 1 wherein the contact is affected at an elevated temperature.

5. The method of preparing for storage and shipment a storage battery plate which comprises charging the plate, and then contacting the active material of the plate with a solid adsorbent material, the said material being of such character as not to stick to the plate.

6. The method according to claim 5 wherein the material is a silica gel.

7. The method of preparing for storage and shipment a storage battery plate which comprises washing the plate after charging the same, to remove the electrolyte, and then contacting the active material of the plate with a solid adsorbent material capable of adsorbing liquid, the said material being of such character as not to stick to the plate.

8. The method of preparing for storage and shipment a storage battery plate which comprises washing the plate after charging the same to remove the electrolyte, and then contacting the active material of the plate with silica gel.

9. The method of preparing a wet charged battery plate that will not oxidize or sulphate to any substantial extent, so that substantially all of its charge is available after storage or shipment, which comprises contacting the active material of the plate with granular sorbent material.

10. The method of preparing a wet charged battery plate that will not oxidize or sulphate to any substantial extent, so that substantially all of its charge is available after storage or shipment, which comprises contacting the active material of plate with granular adsorbent material.

11. The method of preparing a wet charged battery plate that will not oxidize or sulphate to any substantial extent, so that substantially all of its charge is available after storage or shipment, which comprises contacting the active material of the plate with granular silica gel.

12. The method according to claim 9 wherein the plate treated is a negative plate.

13. The method according to claim 10 wherein the plate treated is a negative plate.

14. The method according to claim 11 wherein the plate treated is a negative plate.

15. The method according to claim 9 wherein the plate treated is a lead-sponge plate.

16. The method according to claim 10 wherein the plate treated is a lead-sponge plate.

17. The method according to claim 11 wherein the plate treated is a lead-sponge plate.

18. The method of preparing a charged battery plate that will not oxidize or sulphate to any substantial extent, so that substantially all of its charge is available after storage or shipment, which comprises washing the electrolyte therefrom with water, and then contacting the active material of the plate with sorbent material.

19. The method of preparing a charged battery plate that will not oxidize or sulphate to any substantial extent, so that substantially all of its charge is available after storage or shipment, which comprises washing the electrolyte therefrom with water, and then contacting the active material of the plate with adsorbent material.

20. The method of preparing a charged battery plate that will not oxidize or sulphate to any substantial extent, so that substantially all of its charge is available after storage or shipment, which comprises washing the electrolyte therefrom with water, and then contacting the active material of the plate with silica gel.

21. The method according to claim 18 wherein the plate treated is a negative plate.

22. The method according to claim 19 wherein the plate is a negative plate.

23. The method according to claim 20 wherein the plate treated is a negative plate.

24. The method according to claim 18 wherein the plate treated is a lead-sponge plate.

25. The method according to claim 19 wherein the plate treated is a lead-sponge plate.

26. The method according to claim 20 wherein the plate treated is a lead-sponge plate.

In testimony whereof I have signed this specification this 9th day of July, 1925.

WILLIAM SCOTT HUTCHINSON.